United States Patent [19]

Kirkup

[11] 4,159,684

[45] Jul. 3, 1979

[54] METHOD FOR INCINERATING WASTE SLUDGES

[75] Inventor: William M. Kirkup, Blunham, England

[73] Assignee: Esmil-Envirotech, Ltd., Huntingdon, England

[21] Appl. No.: 744,413

[22] Filed: Nov. 23, 1976

[51] Int. Cl.² ............................................. F23G 5/00
[52] U.S. Cl. ...................................... 110/346; 44/1 D
[58] Field of Search ............ 44/1 D; 241/24; 110/1, 110/7 R, 7 B, 7 S, 15

[56] References Cited

U.S. PATENT DOCUMENTS

| 2,026,969 | 1/1936 | Flynn | 110/15 |
| 2,656,118 | 10/1953 | Chelminski | 110/7 S |
| 3,805,713 | 4/1974 | Notary | 110/7 S |
| 3,910,775 | 10/1975 | Jackman | 44/1 D |
| 3,961,913 | 6/1976 | Brenneman | 44/1 D |

*Primary Examiner*—Kenneth W. Sprague
*Attorney, Agent, or Firm*—Stevens, Davis, Miller & Mosher

[57] ABSTRACT

Dewatered sewage sludge (i.e. sewage sludge containing e.g. 75% water when dewatered) is incinerated when mixed with coal fines recovered from a wet benification process for coal, the coal fines being in the form of either coal filter cake or ex-lagoon sludge. If the coal fines are added to the sewage sludge before or during dewatering of the latter by filtration, the coal acts as a filter aid. Autothermic combustion of the mixture can be obtained.

8 Claims, No Drawings

METHOD FOR INCINERATING WASTE SLUDGES

The invention relates to sewage sludge incineration, in which the sludge is incinerated, in dewatered condition, when mixed with fine coal as a supplementary fuel.

By the term sludge, we include slurries.

The amount of moisture mixed with solid in a sewage sludge varies. Before dewatering it may be 90%. After dewatering it may be 75% for example. The invention is especially applicable to "disposable" sludges i.e. materials which are sufficiently rigid or viscous to be handled without pumping.

Sewage sludge incineration may be performed on sludges which have been dewatered either in batchwise or continuous processes. By a dewatered sewage sludge, we mean one from which some water has been removed, although the dewatered sludge in fact generally contains water as a major proportion. Though batchwise dewatered sludge generally has a lower moisture content and hence may not require supplementary fuel for incineration, continuous dewatering of sludge is usually favoured, notwithstanding the fact that continuously dewatered sludges may require supplementary fuel for incineration. This is because, with batchwise dewatering, considerable difficulties arise in the preparation of the dewatered sludge for subsequent incineration. Continuous dewatering may be performed by such means as centrifuges, rotary vacuum filters, filter belt presses etc, whereas batchwise dewatering is generally performed by means of filter presses. Since, however, the prices of fuel oil and gas which can be used as supplementary fuel have had a strong tendency to rise, the fuel cost of incinerating continuously dewatered sludges has become very high or even prohibitive.

British Patent specifications Nos. 272,981 and 1,286,532 and U.S. Pat. No. 3,759,196 propose the mixing of coal with household refuse prior to incinerating it. Pulverised coal or coke or even anthracite are suggested for this purpose, but these are expensive fuels. British Pat. No. 949,000 also suggests the use of pulverised coal or broken coal in the combustion of dewatered sewage sludge, the mixture of coal and sewage being burned for example in a normal furnace of a power station. British Pat. No. 1,198,958 discloses the mixing of solid sewage waste with coal tip waste and waste oil, but the difficulty of obtaining solid sewage waste is great and the proportion of sewage waste (25%) in the mixture is very low.

One object of the present invention is to provide a method of incinerating sewage sludge which is highly economical. Another object is to provide a method of incinerating sewage sludge which uses as supplementary fuel a material which otherwise has little usefulness and is therefore cheap.

Surprisingly it has now been found that non-autothermic sewage sludge, especially continuously dewatered sludge, may be made autothermic (i.e. able to sustain combustion) in a relatively cheap and easy way. According to the invention this may be achieved if the fine coal mixed with the sludge is coal fines recovered from a wet benification process for coal, the coal fines being in the form of coal filter cake or ex-lagoon sludge. Desirably coal fines are employed of which the great bulk, e.g. at least 90% passes a BSS (British Standard Sieve) No. 30 sieve.

Coal filter cake or ex-lagoon sludge is relatively cheaply available from many coal mines and preparation plants and even if it has to be transported over a substantial distance the new method can still become attractive economically. Without further processing, coal filter cake can at present only be used with other materials in limited quantities for steam raising or other purposes. Hitherto ex-lagoon coal sludge is largely considered to be a discard material.

Preferably, the sewage sludge is continuously dewatered and desirably the coal fines are continuously admixed.

Although it is possible to mix the coal fines to the sewage sludge after dewatering, it has been found to be advantageous to mix the coal fines prior to at least the completion of dewatering of the sludge, and preferably prior to the whole dewatering process.

It has been found that the mixing in of the coal fines itself need not pose any technical difficulties. Any usual types of continuous mixer, such as a screw conveyor, may in general be adapted to this job or as mentioned above mixing may be carried out in the filtering apparatus or its feed system. For instance, where the sewage sludge is dewatered in a filter trough in which it is agitated, the coal fines may be added to the sludge in the trough and the agitator allowed to provide distribution of the coal through the sludge. Alternatively, where dewatering is performed in a filter press, the coal fines may be added via the feed pump circuit of the filter press.

To obtain adequate uniformity of distribution when small amounts of coal are added, or very dry coal cake which might remain in lumps is used, special steps may be necessary.

If the coal fines are added before the completion of dewatering, apart from the advantage that mixing is in general easier before complete dewatering of the sludge, the following advantages may be obtained. The added coal fines increase the solids content of the mixture and can act more or less as a "filter aid" and consequently improve the dewatering action. If dewatering is performed using filter cloth, dewatering a mixture containing coal fines can result in less risk of blinding of the cloth by the cake with the advantages of better cake discharge, greater cloth life and more efficient filtration. A further advantage obtainable with the new method is that the filter cake produced breaks more easily prior to entry into the furnace, on account of the mixed-in particulate coal.

The new method can therefore not only result in a dewatered sewage sludge having a higher calorific value, but also in a sludge cake which contains less water and has improved handling properties.

A typical particle size analysis for fine coal in the form of "flotation" coal fines which are formed into coal filter cake is given in Table 1.

Table 1

| Size | B.S.S. | Weight % |
|---|---|---|
| + 14 |  | 0.02 |
| − 14 | + 22 | 1.09 |
| − 22 | + 30 | 4.96 |
| − 30 | + 60 | 19.61 |
| − 60 | +120 | 16.10 |
| −120 | +240 | 12.39 |
|  | −240 | 45.83 |

Delivered as coal filter cake, coal fines may contain approximately 24% by weight free moisture, whereas similar coal fines delivered as ex-lagoon sludge may contain approximately 30% free moisture. The dry content of such coal generally has a calorific value of between 7500 and 8500 kcal/kg.

Table 2 gives a typical comparison of the calorific value and the costs per kcal of various fuels.

Table 2

| Comparative Costs | | Comparative Cost Per |
|---|---|---|
| Fuel | Calorific Value (approx) | kcal |
| Oil | 18500 BTU/lb (10286 kcal/kg) | 100% |
| Natural Gas | 22800 BTU/lb (12675 kcal/kg) | 88% |
| Coal | 13630 BTU/lb (7578 kcal/kg) | 27% |

This table makes it clear that the replacement of oil or natural gas as fuel by fine coal results in a real economic improvement. This improvement is, however, still more important when it is taken into account that the sewage sludge-coal mixture may contain less moisture and may more easily be handled. Therefore although the dry content which is fed to the furnace may be greater, yet the gross loading rate may be reduced which permits the use of a smaller furnace.

Even with a moisture content of the coal fines of 20 to 35% by weight an economical process may still be obtained.

For instance, with a dewatered sewage sludge containing 75% moisture, good results were obtained by adding at least 8% by weight of coal fines (calculated on the basis of the weights of the sludge in dewatered form and of the dry matter in the coal fines). Thus since coal fines may contain for example 20% moisture, at least 10% by weight of wet coal fines would be required. Both low and high calorific value fine coal may be used for the new process.

Although the method may also be applied to a sewage sludge which is dewatered non-continuously in a filter press, i.e. is incinerated batchwise, best results with the new method may in general be obtained by continuously dewatering the mixture of sewage sludge and coal by centrifugation or filtration and thereupon continuously incinerating it. Many suitable continuously operating furnaces are known in the art, which makes it superfluous to describe a specific furnace which is especially suited for this job.

The importance of the present invention may be elucidated from the following data.

Fresh sewage sludge contains as a typical example 74.0% combustibles by weight (in the usual dry state) giving 26.0% ash on combustion. The calorific value is 10285 BTU/lb (of dry material) (5718 kcal/kg). Furnace feeds for normal municipal sewage sludge are usually designed for a solids content of the sludge of 25% by weight. Such sludges may be obtained by dewatering on a rotary vacuum filter, after dosing with ferric chloride, and typical burning rates for them vary from 34 to 59 kg/hr. per sq. m. of furnace hearth.

The choice of furnace size depends on feed characteristics and the rate of wet feed per unit of surface of furnace area, and as can be imagined, the wetter the feed, generally the lower the unit calorific value and the greater the area required for drying the sludge and the larger the furnace that is required. If the solids content decreases from 25% to between 18 and 22% the furnace loading rate has to be reduced by 10% and even by 15% if the solids content decreases to between 14 and 17%. By adding coal fines the solids content of the feed may be increased considerably thus enabling a more economical furnace to be employed.

When dewatering sewage sludges with a centrifuge it is not usually possible to obtain a higher solids content than 17%. Adding coal fines may increase this solids content considerably, which in turn helps to render the mixture autothermic.

It is clear that variations in the quantity of coal fines admixed are permissible. It may be advantageous if the coal feed rate is used to control the combustion temperature in the incineration furnace.

By the admixture of coal fines the invention makes it possible to produce sewage sludges comparable with the sludges of high calorific value which are obtainable from a filter press by a batch process. The latter sludges may have up to 35% solids, and the resulting cakes will burn autothermically but they cause certain difficulties in the preparation of the sludge material for the subsequent incineration. We will consider for comparison a normal dewatered sewage sludge having 75% moisture, to which coal fines are admixed in accordance with the invention. On average the volatiles (combustibles) in such a sludge make available about 975 kcal/kg of dewatered sludge. With combustion employing a 50% excess air ratio, it is calculated that such a sludge has a supplementary heat requirement of 500 kcal per kg of dewatered sludge to render it autothermic. This may be supplied by admixing 10.2% by weight coal filter cake (24% free moisture) or 10.7% by weight ex lagoon coal sludge (30% free moisture) assuming that the dry content of the coal has a calorific value of 7715 kcal/kg and assuming 80% efficiency of combustion of the coal. In practice, of course, more coal than this is required to take account of radiation losses and heat losses to cooling air; these may be calculated by known methods.

Many sludges can contain moisture which includes combustible liquid as well as water, e.g. hydrocarbons (fuel) which can aid combustibility. The dewatering process referred to herein includes the removal of such moisture.

I claim:

1. A method of incinerating a sewage sludge comprising incinerating a sludge, in dewatered but wet condition, when mixed with wet coal fines as a supplementary fuel recovered from a wet benification process for coal, in the form of one of a coal filter cake and ex-lagoon sludge.

2. The method according to claim 1 wherein the sewage sludge is dewatered in a continuous process.

3. The method according to claim 1 wherein the coal fines are admixed to the sewage sludge prior to at least the completion of dewatering of the sludge.

4. The method according to claim 1 wherein the mixture of sewage sludge and coal fines is dewatered by one of centrifugation and filtration and is continuously incinerated.

5. The method according to claim 4 wherein the sewage sludge is dewatered by filtration, and the coal fines are added before or during filtration so as to act as a filter aid.

6. The method according to claim 1 wherein the quantity of coal fines added is at least 80% by weight (calculated on the basis of the weights of the sludge in dewatered condition and of the dry matter of the coal fines).

7. The method according to claim 1 wherein the mixture of sludge and coal fines is autothermic.

8. The method according to claim 6 wherein the moisture content of the coal fines is from 20 to 35% by weight.

* * * * *

UNITED STATES PATENT AND TRADEMARK OFFICE
CERTIFICATE OF CORRECTION

PATENT NO. : 4,159,684
DATED : July 3, 1979
INVENTOR(S) : William M. Kirkup

It is certified that error appears in the above—identified patent and that said Letters Patent is hereby corrected as shown below:

Claim 6, line 59, "80%" should read -- 8% --.

Signed and Sealed this

Fourth Day of March 1980

[SEAL]

Attest:

SIDNEY A. DIAMOND

Attesting Officer

Commissioner of Patents and Trademarks